Patented Oct. 11, 1949

2,484,543

UNITED STATES PATENT OFFICE 2,484,543

CARAMEL-FLAVORED STARCH POWDER

Arthur R. Baldwin, Berwyn, and William Hach, Oak Park, Ill., assignors to Corn Products Refining Company, New York, N. Y., a corporation of New Jersey No Drawing. Application July 26, 1948, Serial No. 40,792

8 Claims. (Cl. 99—139)

1

The present invention relates, generally, to the provision of a non-hygroscopic, free-flowing, caramel flavored starch powder and to a method of making the same.

Prepared pudding mixes have become well established consumer items in recent years. These mixes have been progressively perfected and there is considerable competition with respect to quality between the several different manufacturers thereof. One of the most popular of these mixes is the prepared caramel flavored pudding mix. It has been generally recognized that the present caramel flavored pudding mixes are subject to noticeable variation in flavor, not infrequently having a rather bitter or burned taste, and tend not to be free-flowing (i. e. they tend to cake) when stored under ordinary atmospheric conditions in commercial type packages.

The principal base or ingredient of the caramel flavored pudding mixes has been a mixture of pulverized caramel and starch. Such a mixture tends to vary considerably in flavor and, because of its hygroscopicity, tends to cake to an undesirable degree. As currently manufactured, sugar is caramelized to the desired degree and then the caramel is cooled and solidified by pouring onto a slab or chilling on cold rolls, after which it is ground and mixed with starch so as to diminish the hygroscopic characteristics. Preferably, the solidified caramel is ground in the presence of starch. However, the small caramel particles in the starch remain noticeably hygroscopic, and the presence of the starch alone does not eliminate or sufficiently reduce their hygroscopicity. In order to decrease the hygroscopic effect, the practice has been to carry out the grinding and mixing operations, as far as possible, in a cool, dry atmosphere. However, even when so prepared under the most favorable conditions, the resulting caramel-starch product is undesirably hygroscopic for use in packaged pudding mixes.

Furthermore, the present method of preparing the caramel-starch powder or mix is characterized by an objectionable lack of uniformity in the caramel flavor, and not infrequently it has a bitter or burned taste. This defect in flavor appears to be inherent in the method of preparing and handling the caramel. Thus, after the sugar has been caramelized to the point where it has the proper flavor, a substantial portion of the caramel continues to remain at the caramelization temperature before it becomes chilled. Obviously, the caramel becomes increasingly overcaramelized, even to the point of burning, as it is poured out onto the chilling rolls.

Surprisingly, we have found that by proper addition of water to the caramel we are able to prepare a caramel flavored starch powder which is both free-flowing under ordinary atmospheric conditions and is characterized by a very uniform flavor, entirely free from any bitterness or burned taste.

Accordingly, the object of the present invention is the provision of a caramel flavored starch powder, and pudding mixes made therefrom, which are characterized by their uniform caramel flavor and freedom from bitterness or charring, and by their non-hygroscopic, free-flowing properties when stored or packaged under ordinary atmospheric conditions. An important object of the invention is the provision of a new and improved method of making such an improved caramel-flavored starch powder.

Certain further specific objects of the invention will, in part, be obvious and in part appear hereinafter.

The two following examples will serve to illustrate two specific embodiments of the invention:

Example 1

Sixty pounds of sucrose (i. e. cane sugar) were heated to 374–382° F. in a gas-fired kettle until the desired point of caramelization was reached. Sufficient water (approximately 50 pounds) having a temperature of approximately 65° F. was added to the caramel with rapid stirring so as to produce a caramel sirup solution having a specific gravity of approximately 32°–35° Bé. at 60° F. The water serves rapidly to cool the caramel below caramelization temperature. The solution at a temperature of 120° F. was filtered through a No. 17 nylon fabric and added with mixing to two hundred thirty two pounds of starch in a horizontal ribbon blender. In order to facilitate mixing with the starch, the solution may be diluted to 30° Bé. After mixing for one hour, the blend was transferred to trays for drying at 160–180° F. During drying the moisture content of the product was reduced to approximately ten per cent. The dried material contained few lumps, was non-hygroscopic, and could be easily ground to pass 100 mesh. The finished powder was used for the preparation of uniformly flavored, free-flowing, caramel-flavored pudding mixes. During storage of either the caramel-starch powder or the complete pudding mix, there was no significant caking. Various samples of the powder and pudding mixes made therewith had uniform caramel flavor with no detectable bitterness or burned taste evident.

Example 2

Fifty pounds of cane sugar were caramelized at 318° F., and when the desired point of caramelization was reached at this temperature, the caramel was diluted with forty-two pounds of water having a temperature of 70° F. The resulting solution at 147° F. weighed ninety-one pounds, the loss in weight of one pound being due to loss by evaporation. This sirup product was caramelized uniformly and free from burned or bitter flavors. One portion of the above 30° Bé. solution (e. g. 1985 grams) having a pH value of 3.6 was mixed with 4540 grams of corn starch. After drying in a rotary dryer with counter-current air flow and grinding, the resulting product was a uniform, non-hygroscopic, free-flowing powder, suitable for use in caramel-flavored pudding mixes.

A second portion of the caramel sirup was neutralized to a pH value of 6.0 by addition of sodium bicarbonate and then similarly mixed with starch, dried, and ground. The neutralization serves to eliminate the small amount of starch hydrolysis caused by the acidic caramel.

*Example 3*

Sucrose was caramelized to just short of the proper degree in a gas-fired caramel cooker and twenty-five pounds of the hot caramel were removed and the reaction was allowed to continue until the temperature had decreased to 280° F. Water was then added in the form of a fine spray onto the caramel while the latter was continuously stirred. This technique allows uniform evolution of steam and is preferable and safer than adding the water in the form of a large stream. The resulting 30° Bé. caramel sirup was then sprayed onto starch and blended therewith, and the blended product was dried to a moisture content of approximately ten per cent and then ground to a free-flowing, non-hygroscopic powder.

As will be apparent from the foregoing specific examples, our improved process of preparing non-hygroscopic, free-flowing, caramel-starch powder comprises the five following essential steps:

1. Caramelization of sugar
2. Cooling the caramel with water
3. Mixing the caramel sirup solution with starch
4. Drying the caramel-starch blend or mixture
5. Comminuting the dried caramel-starch mixture to desired fineness.

As an additional optional step, the caramel sirup solution may be neutralized prior to mixing with the starch.

The caramelization step may be carried out in accordance with known procedure and does not require elaboration. Experience has shown that the cooling step should fulfil two different conditions. First, the caramel must be rapidly cooled, below caramelization temperature, and second, the resulting sirup solution should have a specific gravity within the range of 30–35° Bé. If the concentrations are much in excess of 35° Bé., it is difficult to obtain good dispersion of the sirup onto the starch carrier. On the other hand, sirup concentrations below approximately 30° Bé., among other things, requires that an excessive amount of water be removed from the caramel-starch mix. Accordingly, in the cooling step, sufficient water should be added to the caramel at a sufficiently low water temperature so as to result in rapid cooling of the caramel below caramelization temperature (e. g. about 200° F.) and to also result in a caramel sirup solution having a specific gravity within the range of 30–35° Bé.

The step of mixing the caramel sirup solution with starch is not particularly critical. This step may be carried out in different types of equipment following known procedures, and the relative proportions of the sirup and starch may vary rather widely. However, in any case, sufficient starch must be used so as fully to take up all of the sirup. Generally, from 3 to 5 parts of starch should be used for each part of sirup. The sirup may be sprayed onto the starch or may be otherwise incorporated therein. The sirup and starch may be uniformly blended together in known commercial blending equipment such as a ribbon blender or a Banbury mixer. The starch should preferably have an original moisture content of approximately ten per cent, since, bone-dry, or nearly bone-dry, starch does not mix as readily and uniformly with the sirup. The resulting mixture of starch and caramel should not have a moisture content in excess of about 20%.

The caramel-starch mix or blend may be dried in suitable drying equipment, below the temperature at which the starch gelatinizes. A drying temperature of approximately 160–180° F. is generally suitable when the moisture is controlled, as previously indicated. Tray type drying equipment is satisfactory, although other known types may be used.

The comminuting operation for reducing the dried caramel-starch flake to a fine powder may be carried out in known, conventional, fine crushing or pulverizing equipment, such as a ball mill or a hammer mill.

If a neutralization step is to be used in the process, sodium bicarbonate is the preferred neutralizing or alkaline material for this purpose. However, other alkaline material, such as potassium bicarbonate, can be used.

Having fully described our invention and the present preferred manner of practicing the same, what is claimed as new is:

1. The method of preparing non-hygroscopic, free-flowing, caramel-flavored starch powder, which comprises, caramelizing sugar to the desired degree, rapidly cooling the resulting caramel below caramelization temperature by addition of water thereto, mixing the resulting caramel sirup solution with starch, drying the caramel-starch mixture, and comminuting the resulting dried mixture to a powder.

2. The method of preparing non-hygroscopic, free-flowing, caramel-flavored starch powder, which comprises, caramelizing sugar to the desired degree, rapidly cooling the caramel below caramelization temperature by addition thereto of sufficient water to produce a caramel sirup solution having a specific gravity within the range of 30–35° Bé., mixing said solution with sufficient starch to take up the same, drying the resulting sirup-starch mix, and comminuting the dried product to a powder.

3. The method of preparing non-hygroscopic, free-flowing, caramel-flavored starch powder, which comprises, caramelizing sugar to the desired degree, rapidly cooling the caramel to at least 200° F. by adding water in such quantity and at such temperature as to produce a caramel sirup solution having a specific gravity within the range of about 30–35° Bé., uniformly mixing said sirup solution with from about 3 to 5 parts by weight of starch powder having a moisture content of approximately ten per cent, drying the resulting caramel-starch mixture to a moisture content within the range of about 7–10 per cent at a temperature below that at which said starch gelatinizes, and comminuting the dried caramel-starch mixture to a powder.

4. The method called for in claim 2 wherein said caramel sirup solution is neutralized to a pH of approximately 6 by addition thereto of an alkali metal bicarbonate.

5. The product made in accordance with the method of claim 1.

6. The product made in accordance with the method of claim 2.

7. The product made in accordance with the method of claim 3.

8. The product made in accordance with the method of claim 4.

ARTHUR R. BALDWIN.
WILLIAM HACH.

REFERENCES CITED

The following references are of record in the file of this patent:

UNITED STATES PATENTS

| Number | Name | Date |
|---|---|---|
| 2,045,019 | Lorenzen | June 23, 1936 |